US008981912B2

(12) United States Patent
Talstra et al.

(10) Patent No.: US 8,981,912 B2
(45) Date of Patent: Mar. 17, 2015

(54) PUSHBITS FOR SEMI-SYNCHRONIZED POINTING

(75) Inventors: Johan Cornelis Talstra, Eindhoven (NL); Hendricus Theodorus Gerardus Maria Penning De Vries, Mierlo (NL); George Frederic Yianni, Eindhoven (NL)

(73) Assignee: Koninklijkle Philips N.V., Eindhoven (NL)

( * ) Notice: Subject to any disclaimer, the term of this patent is extended or adjusted under 35 U.S.C. 154(b) by 377 days.

(21) Appl. No.: 13/380,555

(22) PCT Filed: Jun. 14, 2010

(86) PCT No.: PCT/IB2010/052640

§ 371 (c)(1), (2), (4) Date: Dec. 23, 2011

(87) PCT Pub. No.: WO2010/150131

PCT Pub. Date: Dec. 29, 2010

(65) Prior Publication Data

US 2012/0092204 A1 Apr. 19, 2012

(30) Foreign Application Priority Data

Jun. 23, 2009 (EP) .................................... 09163439

(51) Int. Cl.

*G05B 11/01* (2006.01)
*G08C 17/02* (2006.01)
*G08C 23/04* (2006.01)
*H05B 37/02* (2006.01)

(52) U.S. Cl.

CPC ................ *G08C 17/02* (2013.01); *G08C 23/04* (2013.01); *H05B 37/0272* (2013.01); *G08C 2201/71* (2013.01)

USPC ....... 340/12.23; 340/4.3; 340/4.31; 340/4.32; 340/12.24; 340/12.25; 340/13.21; 341/176; 361/728; 361/814; 362/233; 362/394; 362/529; 315/153; 315/154; 315/222; 315/291; 315/292; 315/297; 315/314; 315/316

(58) Field of Classification Search

None

See application file for complete search history.

(56) References Cited

U.S. PATENT DOCUMENTS

| | | | | |
|---|---|---|---|---|
| 7,016,115 | B1 | 3/2006 | Leeb et al. | |
| 7,417,556 | B2 | 8/2008 | Ling | |
| 2003/0107888 | A1 * | 6/2003 | Devlin et al. | 362/233 |
| 2009/0052899 | A1 * | 2/2009 | Mok et al. | 398/106 |

(Continued)

FOREIGN PATENT DOCUMENTS

| | | | |
|---|---|---|---|
| JP | 2008104020 | A | 5/2008 |
| WO | 2007095740 | A1 | 8/2007 |

(Continued)

*Primary Examiner* — Curtis King

(74) *Attorney, Agent, or Firm* — Meenakshy Chakravorty

(57) ABSTRACT

A method of selecting a light source among a plurality of light sources by means of a remote controller includes the remote controller: instructing, by omnidirectional transmission, the light sources to each transmit a directional signal comprising a code, which is unique for each light source; —receiving the directional signals from the light sources; and selecting one of the light sources on basis of the received directional signals. Furthermore, the method includes: generating, remotely of the light sources, codes to be transmitted by the light sources; and—the remote controller instructing each one of the light sources which one of the remotely determined codes to transmit.

13 Claims, 5 Drawing Sheets

(56) References Cited

U.S. PATENT DOCUMENTS

| | | | | |
|---|---|---|---|---|
| 2009/0153390 | A1* | 6/2009 | Zackschewski et al. | 341/176 |
| 2009/0218951 | A1* | 9/2009 | Weaver | 315/154 |
| 2009/0322582 | A1* | 12/2009 | Baugh et al. | 341/176 |
| 2010/0013695 | A1* | 1/2010 | Hong et al. | 341/176 |
| 2012/0135692 | A1* | 5/2012 | Feri et al. | 455/67.14 |

FOREIGN PATENT DOCUMENTS

| | | | |
|---|---|---|---|
| WO | 2008030315 | A1 | 3/2008 |
| WO | 2009010909 | A1 | 1/2009 |

* cited by examiner

PUSHBITS FOR SEMI-SYNCHRONIZED POINTING

FIELD OF THE INVENTION

The present invention is related to remote control of a lighting system, and more particularly to the selection of a particular light source among a plurality of light sources by means of a remote controller.

BACKGROUND OF THE INVENTION

In a lighting system having several individual light sources which are capable of communicating with a remote controller, a desired control feature is to be able to control the light output of an individual light source merely by pointing at it with the remote controller and operating a control mechanism, such as buttons or the like.

However, in order to make this work, the remote controller has to be able to identify which one of the light sources the user is actually pointing at. Methods have been developed where each light source transmits a different code in a directional signal by means of modulating its ordinary light output or by means of modulating a separate code transmitting element, such as an IR-LED (InfraRed Light Emitting Diode) or a radio frequency transmitter, e.g. a 60 GHz directional transmitter. The code most prominently received, according to some criterion, by the remote controller is selected. For example the criterion can be "smallest angle of incidence" or "strongest optical signal", etc.

For example, the publication WO 2007/095740 discloses a lighting system where each light source is configured to emit a beacon signal representative of the unique identifier, i.e. code, thereof on command of a remote controller. That is, the remote controller transmits an instruction to the light source that commands the light source to transmit the beacon signal, which is a directional signal. The beacon signal is integrated into the light emitted by the ordinary light source. The remote controller is configured to receive the light and extract the beacon signal therefrom. There are problems with such a lighting system.

One problem is related to synchronization. The remote controller commands several light sources to transmit their codes at the same time. In order for the remote controller to be able to separate the received codes from each other it is equipped with circuitry for correlating the optical signals received from different light sources in one way or the other. In order to obtain a reliable result of which light source is the most prominent one, it is desirable that the optical signals are received by the remote controller at an anticipated point of time, and substantially simultaneous.

Another problem is related to the number of light sources. As the number grows more codes are required. In order to keep a reasonable degree of orthogonality, the length of the codes grows linearly. Longer codes require more time to transmit, or require faster code-generating hardware/software in the light sources.

Further, there are different types of remote controllers, such as those based on simple photodiodes and more advanced remote controllers employing a camera. These different types of remote controllers operate best with different types of codes. In order to be useful in practice the light sources will have to be equipped with multiple code schemes for the beacons, which is cumbersome.

SUMMARY OF THE INVENTION

It is an object of the present invention to overcome at least some of these problems, and to provide a lighting system control that simplifies the coding.

This object is achieved by means of a method of controlling a lighting system as defined in claim 1, and by means of a lighting system as defined in claim 13.

Since the codes are generated remotely of the light sources and provided to the light sources by the remote controller, the light sources do not have to be equipped at manufacture with multiple coding schemes for optical signals, or even with any coding scheme. Furthermore, there is no problem of increasing the number of light sources, since the coding is adapted to the number of light sources remotely from the controller.

In accordance with an embodiment of the method, it is the remote controller itself that generates the codes to be transmitted by the light sources. Thereby no other device is needed for the full controlling of the light sources.

In accordance with an embodiment of the method, every code consists of a sequence of one or more code symbols, and the remote controller instructs the light sources to transmit the code symbols at different times, one code symbol at a time, and which symbol to transmit. This is advantageous in that the light sources need only be capable of transmitting a single symbol.

In accordance with an embodiment of the method, the remote controller provides the light sources with a set of predefined code symbols, which set includes at least one code symbol. Thereby, the light sources do not need to know anything about coding, the length of the code, etc.

In accordance with an embodiment of the method, the set of predefined code symbols is dynamically updated in dependence of changes in the total number of light sources. Thereby, the code generation is easily adaptable to the momentary need in the lighting system.

In accordance with an embodiment of the method, the method further comprises selecting the code symbols from a group of code symbols having a primary feature of one of amplitude and frequency. These features are typically involved in the light generation and consequently the optical signal is easily generated by means of existing structures of the light sources.

In accordance with an embodiment of the method, it comprises querying the light sources for their capabilities before generating the codes. In this way it is possible to adapt the codes to the capabilities of the least equipped light sources, thereby providing for example as simple codes as possible or having the option of generating more complex codes, whichever might be desired.

In accordance with an embodiment of the method, it comprises generating codes with different characteristics for different subsets of the light sources. Thereby the coding can be made more efficient. For example, the complexity of the codes can be kept at a low level even if the number of light sources increases, or, if combined with the querying, the light sources can be divided into groups of different levels of capability and codes having different levels of complexity in correspondence with the different capabilities can be generated.

In accordance with an embodiment of the method, several light sources are instructed on one occasion by means of a single broadcast. Thereby the time consumption for the instruction operation is shortened in comparison with an individual instruction operation and the transmission of the light sources is synchronized, at least to a certain degree.

In accordance with another aspect of the present invention there is provided a lighting system arranged to carry out the method. The lighting system provides advantages corresponding to those of the method.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention.

DETAILED DESCRIPTION

Figure 1:
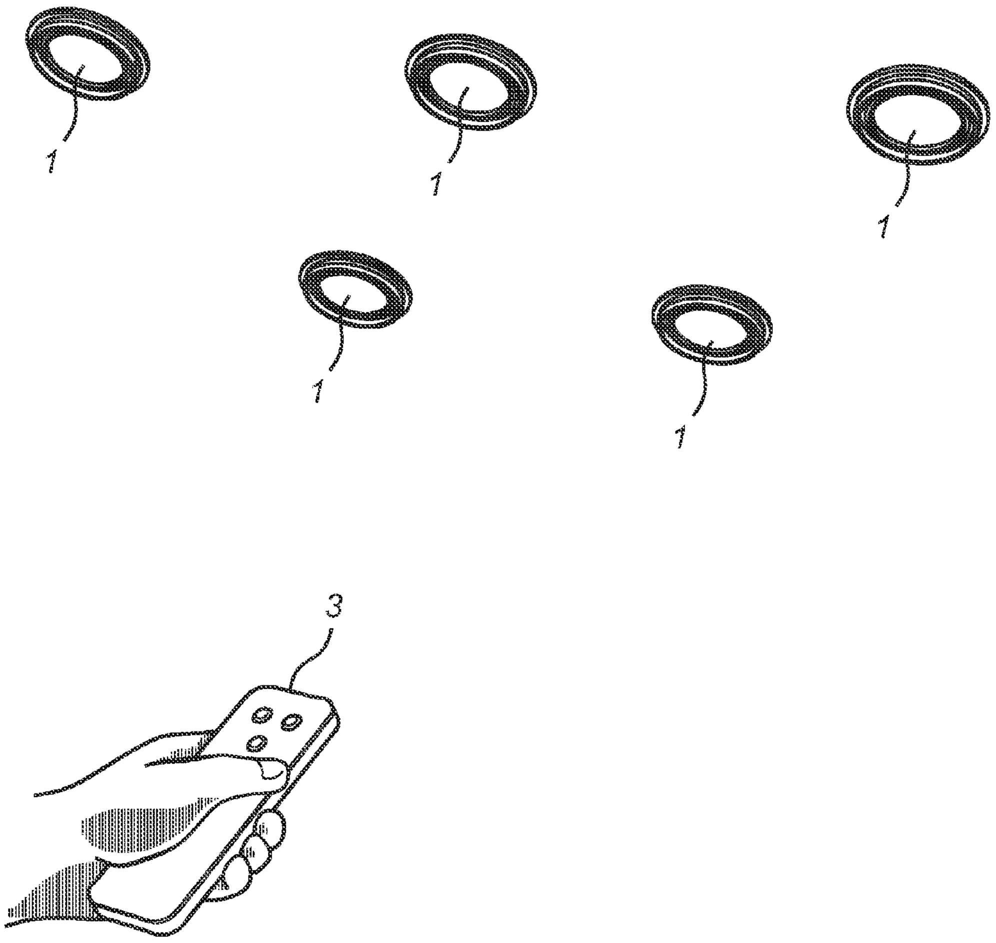
FIG. 1 is a schematic illustration of a lighting system.

Referring to FIG. 1, an embodiment of a lighting system according to this invention comprises several light sources (LS) 1, and a remote controller (RC) 3, which is used to control the settings of the light sources.

Figure 2:
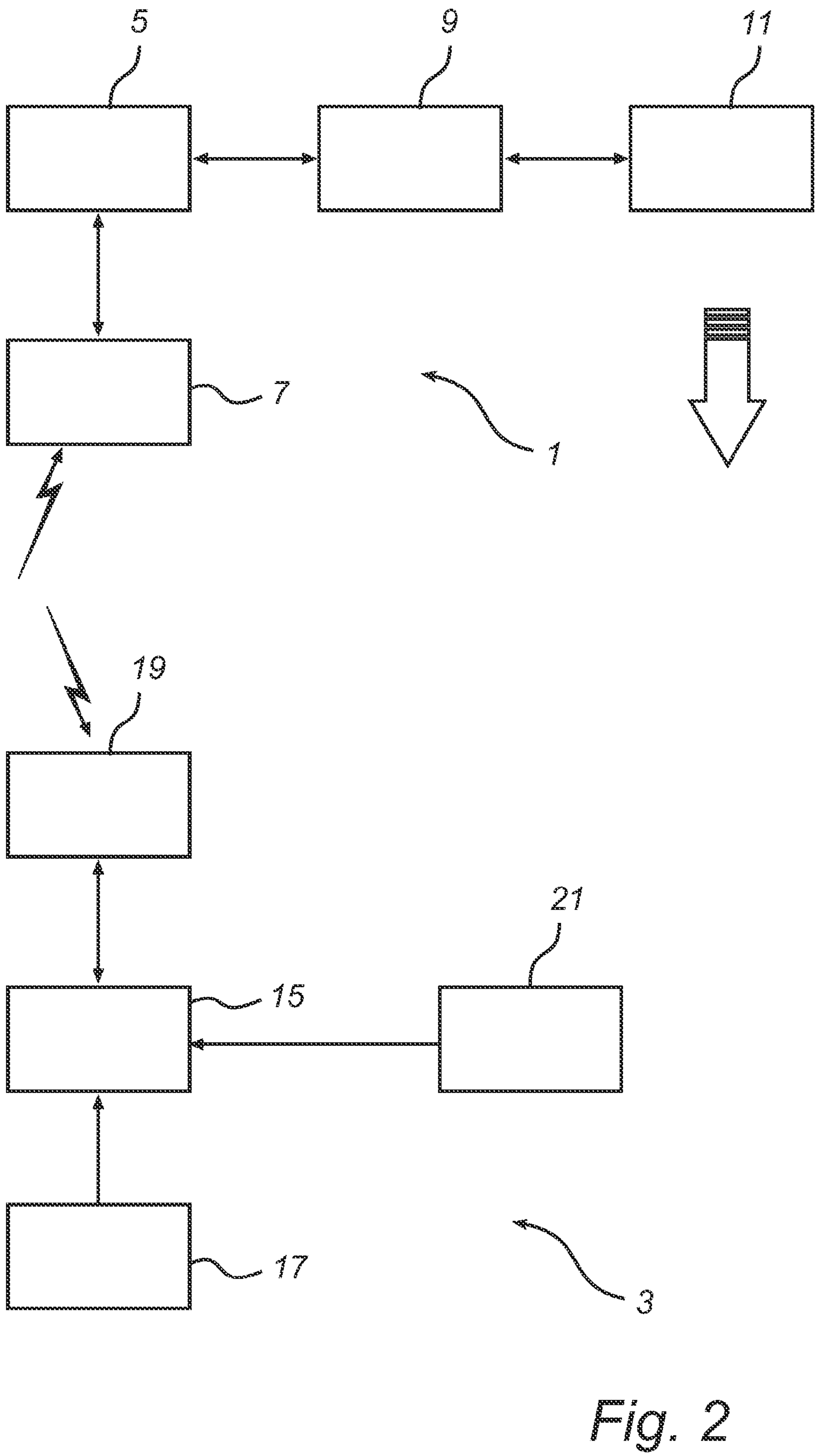
FIG. 2 is a schematic block diagram of an embodiment of a remote controller and a light source according to this invention.

In order to explain the communication between the remote controller 3 and the light sources 1 FIG. 2 shows a block diagram of an embodiment of the remote controller (RC) 3 as well as a light source (LS) 1. The light source 1 comprises a control unit 5, an RF (radio frequency) module 7, connected with the control unit 5, a light element driver 9, connected with the control unit 5, and a set of light elements 11, including at least one light element, connected with the light element driver 9.

The remote controller 3 comprises a control unit 15, a control mechanism 17, connected with the control unit 15, an omnidirectional transmitter, which in this embodiment is an RF (Radio Frequency) transmitter comprised in an RF module 19 in conjunction with a radio receiver, connected with the control unit 15, and a directional signal receiver, here an optical receiver 21, connected with the control unit 15. The control mechanism 17 includes a user interface, such as a touch screen or a number of push buttons. The remote controller 3 is arranged to communicate with the light sources using: (i) on the one hand RF communication by means of the RF modules 7, 19, over an omnidirectional channel, and (ii) on the other hand optical communication by means of the light elements 11 and the receiver 21, over a directional channel, which is also unidirectional from the light source 1 to the remote controller 3. Furthermore, the remote controller 3 comprises signal comparison circuitry, connected to the optical receiver 21 and to the control unit 15, and a transmission indicator, which is comprised in the RF module 19, and connected to the signal comparison circuitry.

According to an embodiment of the method of controlling the lighting system, when the user points at a light source 1 and pushes a control button 17 to change the settings of the light source 1, the remote controller 3 starts communicating with several light sources 1 via wireless radio communication by means of the RF module 19. The several light sources 1 represent all or a subgroup of the light sources 1 in the lighting system. More particularly, the remote controller 3 omnidirectionally transmits instructions to the light sources 1 telling them to transmit the directional signal, which is here an optical signal, comprising a code, which is unique for each light source 1. The different codes are included in the transmitted instruction. In this RF communication the remote controller 3 employs basic identification, or addresses, unique for each light source 1 and generated at manufacture. This is per se known to the person skilled in the art, and for example such addresses are called MAC addresses. The remote controller 3 learns about these addresses in a previous commissioning which will be described below.

Figure 4:
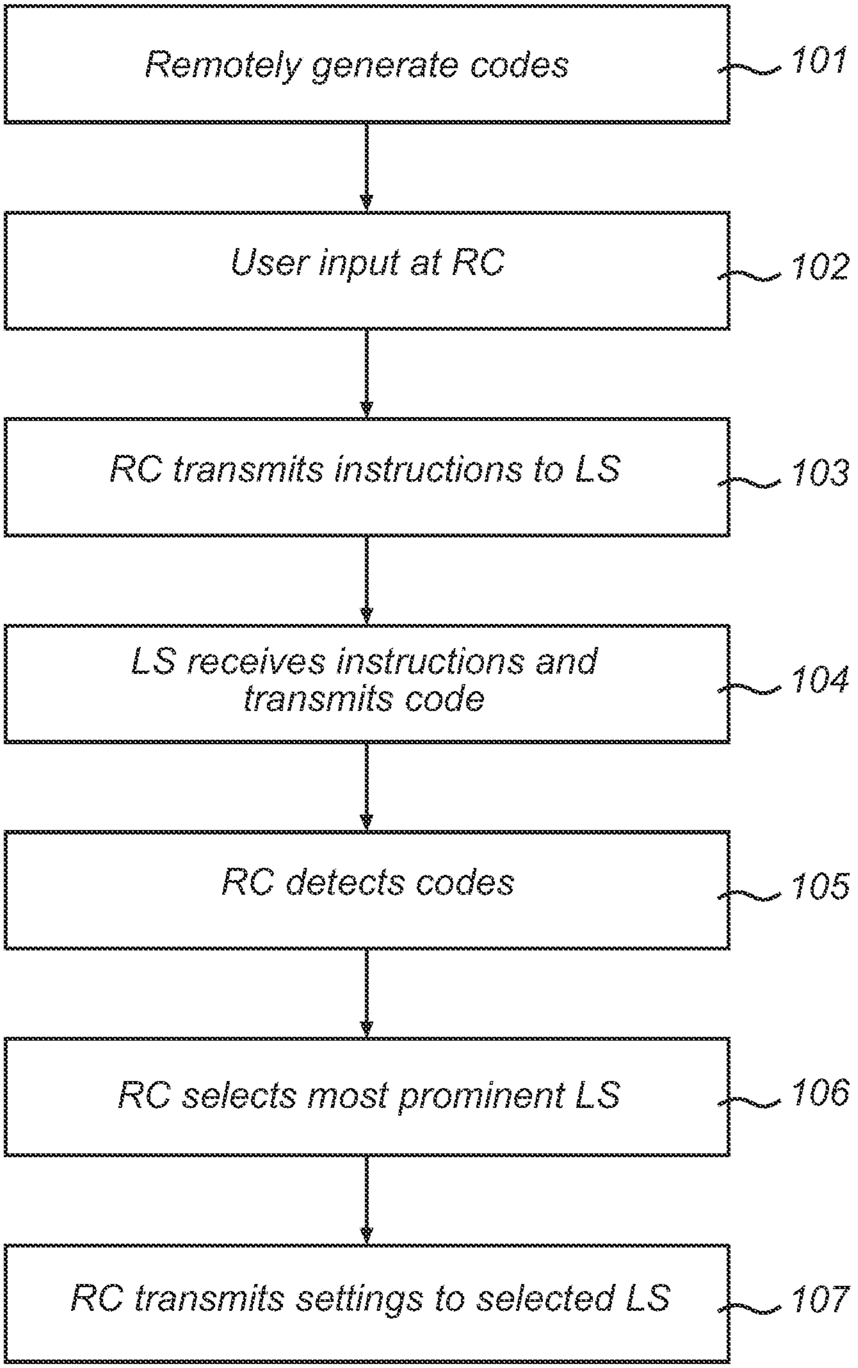
FIGS. 4 and 5 are flow charts of embodiments of the method of selecting a light source according to this invention.

Referring to the flow chart of FIG. 4, in one embodiment of the method the codes are generated remotely of the light sources (LS) 1, in step 101. In this embodiment it is the remote controller (RC) 3 that has generated the codes, but alternatively the lighting system can comprise a central device which generates the codes and sends them to the remote controller 3. When the user points at a light source with the remote controller 3 and pushes a button 17 to set the light output, the following procedure is executed. The remote controller 3 receives, in step 102, the user input and omnidirectionally transmits, by means of its RF module 19, the codes to the light sources 1 together with a command to transmit the codes, step 103. When each light source 1 receives the transmit command and the respective individual code at its RF module 7, it directionally transmits the code as received by means of the set of light elements 11, i.e. as an optical signal, step 104. Then the remote controller 3 in turn receives the optical signals at the optical detector 21, detects the codes, step 105, and performs a selection procedure to recognize which light source 1 the remote controller 3 is pointing at, step 106. When a light source 1 has been selected, the remote controller 3 transmits the new settings to that light source 1, step 107.

According to another embodiment, the codes consist of code symbols, which are also called chips. The remote controller 3 transmits one symbol at a time to the light sources 1. This is advantageous in that the demands on the capability of the light sources can be kept comparably low, since they only have to transmit a single symbol, i.e. a fraction of a code, rather than a full code. As an example, assume that the remote controller 3 has generated two different code symbols S1 and S2, where S1="0", and means "no light", and S2="1", and means "full light", and assume that each code consists of four symbols. Further, assume that there are three light sources, LS1, LS2 and LS3 and that the remote controller has generated codes $c_1$={S1,S1,S2,S2}, $c_2$={S1,S2,S1,S2} and $c_3$={S2,S1,S1,S2} for LS1, LS2, and LS3, respectively.

Figure 5:
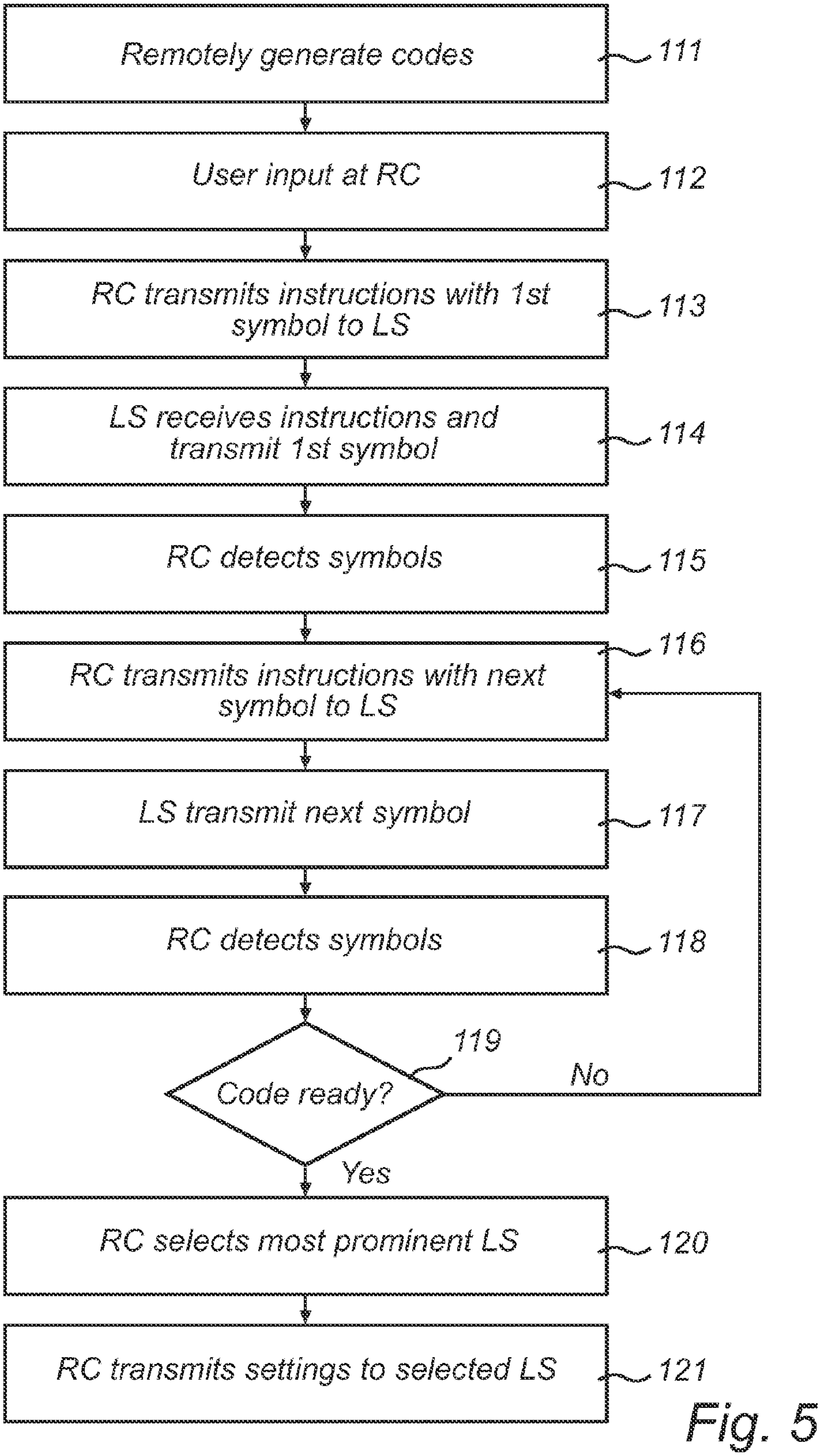

When the user pushes the setting button, step 112 (FIG. 5), the remote controller 3 instructs the light sources 1 to transmit their respective first symbol by transmitting the command {LS1 transmit S1, LS2 transmit S1, LS3 transmit S2} via the omnidirectional channel, step 113. Each respective light source directionally transmits its symbol, step 114. The remote controller 3 measures the detected response, step 115.

The remote controller 3 instructs the light sources 1 to transmit their second symbol with the command {LS1 transmit S1, LS2 transmit S2, LS3 transmit S1}. Again the remote controller 3 measures the detected response, steps 116-118.

Two further operations, which are similar to that in item 2, but with symbols according to the generated codes above, are performed and then all symbols in the codes have been transmitted, and the remote controller 3 is able to finally decide, according to some criterion, as exemplified below, which one of the light sources 1 is most prominent, in step 120, and this light source is decided to be the one the remote controller 3 is pointing at.

Finally, the remote controller transmits the new settings to the selected light source, step 121.

Figure 3:
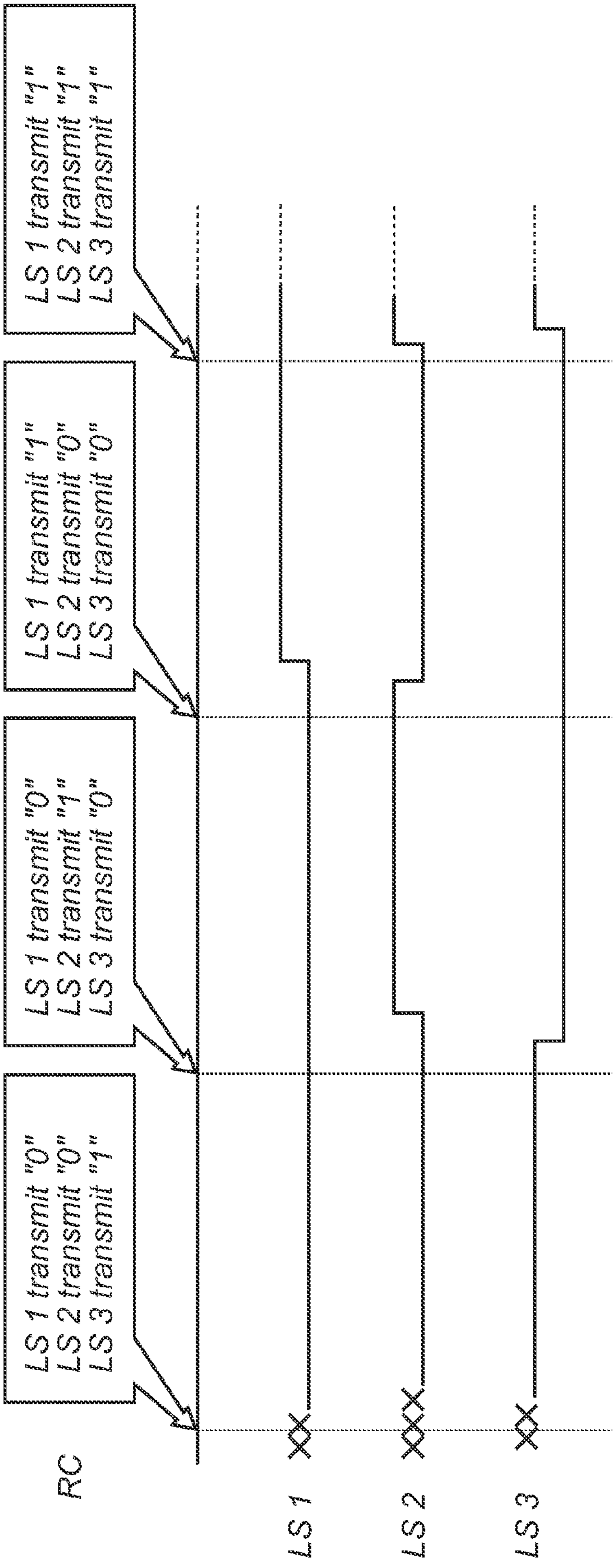
FIG. 3 is a timing diagram of code transmission in the lighting system according to an embodiment of the method and lighting system.

A timing diagram for this example of selecting a light source is illustrated in FIG. 3. Because the remote controller 3 determines when the symbols are to be transmitted, the lighting system is automatically synchronous. This synchronous behavior is true for the operation at large. Looking at a very accurate time scale, however, some delays will occur in practice in the omnidirectional channel and in the processing of commands in the light sources 1. In order to ascertain that the code symbols are actually received at the detector 21 when making the very measurement, an offset, typically in the order of a few milliseconds, is used between the transmission of the commands from the remote controller 3 and the measurement of the received code symbols, or codes in the first embodiment above. Further, the light sources do not need to know about codes, since they simply transmit the symbols when and as they are commanded by the remote controller 3. This means that the light sources 1 do not need to know about how many other light sources there are in the system, etc. As the remote controller 3 determines the lengths of the symbols, or chip-rate, the light sources 1 neither need to know about orthogonal and non-orthogonal codes.

As an optimization, in accordance with an embodiment of the method the commands to the individual light sources to transmit their $n^{th}$ code symbol are combined into a single broadcast, rather than in m separate messages to m light sources. This minimizes the delays in the arrival time that exist on any wireless channel. In a further optimization, the broadcasts following a first broadcast to complete the codes could code only the changes with respect to the previous broadcast. For example, referring to the above example and FIG. 3, the remote controller 3 would transmit {LS1:S1;LS2:S1;LS3:S2}, {LS2:S2;LS3:S1}, {LS1:S2;LS2:S1}, {LS2:S2;LS3:S2}.

A further feature that is applicable is to define a "back-to-normal" command that the remote controller 3 would transmit after the last symbol has been transmitted, since the light sources 1 do not know whether a particular symbol will be the last one. When receiving the "back-to-normal" command, the light sources 1 will return to their setting prior to the first code symbol broadcast. The advantage is that the remote controller 3 does not have to send a separate message to every light source 1 to return it to its previous setting. In addition, or as an alternative, there also is a time-out such that the light sources 1 automatically return to their original setting if they have not received a code symbol broadcast command for a predetermined time period, which for instance can be in the order of one or a few seconds.

As regards the measurements and calculations performed by the remote controller 3 on the received optical signals from the light sources 1, they can be performed according to any useful presently known or future method. For example, a known method is based on measuring an angle of incidence, where the light source having the smallest angle of incidence is selected by the remote controller 3, as disclosed e.g. in non-published application PCT/IB2009/052363. Another method is based on light intensity, where the light source having the strongest intensity is selected by the remote controller 3.

Before the user can start setting the light sources 1, some basic exchange of information has to take place between the remote controller 3 and the light sources 1. This is done during a commissioning phase. During commissioning the remote controller 3 acquires information about the number of light sources in the lighting system, about their inherent identification details, and about what their capabilities are. This information is used for generating appropriate codes and code symbols, which preferably, but not necessarily, should be chosen so as to obtain as short codes as possible, or codes which are efficient for some other reason. When generated, the remote controller 3 transmits information about the code symbols to the light sources. Thus, for example in accordance with an embodiment, the commissioning phase is as follows.

1. The light sources are powered up.

2. Each light source 1 broadcasts, by means of its RF module, a message over the omnidirectional channel saying that it needs to be commissioned. The light source 1 includes its basic identification, such as a MAC address.

3. The remote controller 3 queries the light sources what their capabilities are, while employing the basic identification. For instance, the remote controller 3 may query each light source about what PWM frequencies the light source can create, what its minimum/maximum light output intensity is, the accessible color space for light sources comprising a number of primary light elements, etc.

4. Taking into account the capabilities of the light sources 1, the number of light sources to accommodate, and its own receiver type, the remote controller 3 determines a set of appropriate symbols and a set of codes.

5. The remote controller transmits the definition of the symbols, which is also called an alphabet, to the light sources 1. For embodiments where the remote controller instructs the light sources to transmit the whole code in one operation, instead of a symbol at a time, the remote controller additionally provides the light sources with each respective code.

It is presently preferred that these commissioning steps are executed at the initial startup of the lighting system and in case the alphabet has to be changed when a new light source is added to the lighting system. However, it is only necessary to change the alphabet when the number of light sources grow beyond a certain threshold. Therefore most of the time steps to 1 to 5 adapted to the addition of a single new light source are performed, since the rest of the light sources already have the necessary information. They only have to be updated when the current set of codes cannot accommodate one more light source.

There are alternative ways of performing the commissioning. For instance, the commissioning can take place each time a light source is turned on.

As regards the transmission technology as such, both for the RF communication and for the optical communication, the general knowledge of the person skilled in the art is useful and adequate, and therefore it will not be described in detail herein. However, it should be mentioned that for an application where the remote control is able to set a PWM (Pulse Width Modulation) frequency and duty cycle in the light sources it would be advantageous to use TDMA (Time Division Multiple Access), FDMA (Frequency Division Multiple Access), or CDMA (Code Division Multiple Access) codes for the optical transmission. In such an application, for instance, the light sources 1 can have LED (Light Emitting Diode) light elements, and more particularly a number of primary light elements, such as R (red), G (green), and B (blue) LED light elements. Anyhow, in order to transmit the codes from the light sources 1, some kind of modulation of the light output is performed, such as the on-off modulation used in the above example, or an amplitude modulation. The kind of modulation is chosen, as understood by the skilled person, as far as possible such that the user does not perceive any flicker in the emitted light.

The person skilled in the art realizes that the present invention by no means is limited to the preferred embodiments described above. On the contrary, many modifications and variations are possible within the scope of the appended claims. In addition to those mentioned above, some further examples are as follows.

The symbols generated remotely of the light sources can be different for different light sources in dependence of their capabilities. For example, in a lighting system there may exist older light sources having a simple firmware and/or hardware, and newer light sources having a considerably more advanced firmware and/or hardware providing much greater possibilities of control.

Furthermore, the remote controller can be equipped to consider the surroundings when generating the alphabet. For example, if there is a stationary source of interference, such as the sun or a non-modulated artificial light source, this can be detected and considered.

The lighting system can be arranged such that the remote controller is able to specify the intensity for every symbol relative to the intensity prior to pointing, e.g. +10%/−10%, to limit the visibility of the modulation of the light output. In particular for a pure FDMA scheme there is no need to change the amplitude except if it was at a zero level prior to the selection procedure, and the code transmission can be made virtually invisible.

As a further alternative, in order to facilitate the commissioning for the light source and the remote controller, there are a number of predetermined profiles, which the light source can support, e.g. a simple on/off profile, a profile that can also do PWM-frequency modulation, etc. When queried, the light source reports the profile(-s) it supports.

In an alternative embodiment, the instructions transmitted by the remote controller include a time period during which the light sources should transmit the code symbol.

In a further embodiment the remote controller is arranged to measure a signal-to-noise ratio of the received optical signals, and to change the code of a light source adaptively in order to improve that signal-to-noise ratio.

According to an alternative embodiment, the RF modules used for omnidirectional communication, in the remote controller and in the light sources, are instead IR (InfraRed) modules.

According to an alternative embodiment, the directional transmission from the light sources to the remote controller is performed by means of IR devices, such as IR LEDs. A further alternative is to employ RF directional transmitters, such as 60 GHz RF transmitters. For instance these alternatives are applicable when the light source is an incandescent lamp, which is too slow to be directly modulated.

According to an alternative embodiment, when the light source is a multichannel light source, such as a multichannel LED, the signalling can be performed by means of a single one of the channels. For instance, in an RGB LED lamp, only the R channel can be used for generating the directional signals.

The invention claimed is:

1. A method of selecting a light source among a plurality of light sources by a remote controller, comprising:

the remote controller instructing, by omnidirectional transmission, the plurality of light sources to each transmit a directional signal comprising at least a fraction of a code, which is unique for each light source, wherein each code consists of a sequence of one or more code symbols;

generating, remotely of the plurality of light sources, the codes to be transmitted by the plurality of light sources;

the remote controller instructing each one of the plurality of light sources which one of the remotely determined codes to transmit, the instructing comprising instructing the plurality of light sources to transmit the code symbols at different times, one code symbol at a time, and which code symbol to transmit at what time;

the remote controller receiving the directional signals from the plurality of light sources; and the remote controller performing a selection procedure for selecting one of the plurality of light sources on the basis of the received directional signals, wherein after having selected one light source, instructing the plurality of light sources by the remote controller to return to the settings they had prior to the first code symbol broadcast.

2. The method according to claim 1, wherein the remote controller performs the generation of the codes.

3. The method according to claim 1, comprising:

the remote controller providing the plurality of light sources with a set of predefined code symbols, which set includes at least one code symbol.

4. The method according to claim 3, wherein the set of predefined code symbols is dynamically updated in dependence of changes in the total number of the plurality of light sources.

5. The method according to claim 1, comprising selecting the code symbols from a group of code symbols having a primary feature of one of amplitude and frequency.

6. The method according to claim 1, comprising:

querying a light source for its capabilities before generating the codes.

7. The method according to claim 1, further comprising determining codes with different characteristics for different subsets of the plurality of light sources.

8. The method according to claim 1, comprising instructing several light sources in a single broadcast.

9. The method according to claim 1, comprising changing the code of a light source adaptively by the remote controller so as to improve a signal-to-noise ratio at measuring the received directional signals.

10. The method according to claim 1, wherein the codes are generated such as to create at least one of a TDMA system, an FDMA system, and a CDMA system.

11. The method according to claim 1, further comprising the remote controller transmitting new settings to the selected light source.

12. A lighting system comprising a plurality of light sources and a remote controller, arranged to select a light source among the plurality of light sources, wherein:

the remote controller comprises an omnidirectional transmitter and is arranged to instruct, by means of the omnidirectional transmitter, the plurality of light sources to transmit a directional signal comprising at least a fraction of a code, which is unique for each light source;

the remote controller comprises a directional signal receiver, and is arranged to receive the directional signals from the plurality of light sources; and the remote controller comprises signal comparison circuitry connected with the directional signal receiver, and is arranged to select one of the plurality of light sources on the basis of the received directional signals, wherein the lighting system comprises code generation means arranged to generate, remotely from the plurality of light sources, codes to be transmitted by the plurality of light sources; and the remote controller is arranged to instruct each one of the plurality of light sources which one of the remotely generated codes to transmit, wherein every code consists of a sequence of one or more code symbols, and wherein the remote controller is arranged to instruct the plurality of light sources to transmit the code symbols at different times, one code symbol at a time, and which symbol to transmit, and wherein after having selected one light source, to instruct the plurality of light sources by the remote controller to return to the settings they had prior to the first code symbol broadcast.

13. The lighting system according to claim 12, wherein the remote controller is arranged to perform the generation of codes.

* * * * *